US012602956B2

(12) United States Patent
Herrou et al.

(10) Patent No.: US 12,602,956 B2
(45) Date of Patent: Apr. 14, 2026

(54) MONITOR PERFORMANCE OF ELECTRIC VEHICLE COMPONENTS USING AUDIO ANALYSIS

(71) Applicant: Rivian IP Holdings, LLC, Plymouth, MI (US)

(72) Inventors: Philippe Herrou, Aptos, CA (US); Chris Conklin, San Francisco, CA (US)

(73) Assignee: Rivian IP Holdings, LLP, Irvine, CA (US)

( * ) Notice: Subject to any disclaimer, the term of this patent is extended or adjusted under 35 U.S.C. 154(b) by 385 days.

(21) Appl. No.: 17/890,646

(22) Filed: Aug. 18, 2022

(65) Prior Publication Data

US 2024/0062596 A1 Feb. 22, 2024

(51) Int. Cl.
*G07C 5/08* (2006.01)
*H04R 1/02* (2006.01)

(52) U.S. Cl.
CPC ........... *G07C 5/0816* (2013.01); *G07C 5/085* (2013.01); *H04R 1/025* (2013.01); *H04R 2499/13* (2013.01)

(58) Field of Classification Search
None
See application file for complete search history.

(56) References Cited

U.S. PATENT DOCUMENTS

| | | | | |
|---|---|---|---|---|
| 2004/0186680 | A1* | 9/2004 | Jin | G01P 3/489 702/147 |
| 2014/0126617 | A1* | 5/2014 | Jung | H03M 7/46 375/240 |
| 2018/0350167 | A1* | 12/2018 | Ekkizogloy | B60R 11/0247 |
| 2019/0289446 | A1* | 9/2019 | Kim | H04M 1/725 |
| 2019/0311558 | A1* | 10/2019 | Bika | G07C 5/0841 |
| 2021/0335061 | A1* | 10/2021 | Claessens | G07C 5/0816 |
| 2023/0260332 | A1* | 8/2023 | K | G07C 5/0808 701/31.4 |

OTHER PUBLICATIONS

Stankovic, Ljubisa & Sejdic, Ervin & Stankovic, Srdjan & Dakovic, Milos & Orovic, Irena. (2019). A Tutorial on Sparse Signal Reconstruction and Its Applications in Signal Processing. Circuits, Systems, and Signal Processing. 38:1206-1263 (Year: 2019).*

* cited by examiner

*Primary Examiner* — Jennifer M Anda
(74) *Attorney, Agent, or Firm* — Foley & Lardner LLP

(57) ABSTRACT

Monitoring performance of electric vehicle components using tonal analysis is provided. A system can receive audio data from an electric vehicle captured via a sensor associated with the electric vehicle, the audio data indicative of performance of an electric component of the electric vehicle. The system can detect a change in the performance of the electric component. The change can be detected based on a comparison of the audio data with an audio signature corresponding to the electric component of the electric vehicle. The system can provide a notification indicative of the change in the performance of the electric component responsive to the detection of the change in the performance of the electric component.

20 Claims, 9 Drawing Sheets

100

300

MONITOR PERFORMANCE OF ELECTRIC VEHICLE COMPONENTS USING AUDIO ANALYSIS

INTRODUCTION

Electric vehicles can include electric and mechanical components that drive the vehicle. These components can degrade over time and affect the performance of the vehicle.

SUMMARY

Aspects of this technical solution can be directed to monitoring the performance of components of electric vehicles, such as an electric drive unit, using tonal analysis. Audio sensors such as microphones associated with electric vehicles can record audio data having tones corresponding to a performance of an electric vehicle. For example, the audio data can include tonal data associated with an electric motor, inverter, or gearbox. The electric vehicle can compress the audio data using a lossy compression approach such as compressed sensing (e.g., can select non-uniform sampling points thereof). The lossy compression approach can reversibly compress the tonal data of one or more audio signatures, while reducing the size the file transmitted from the electric vehicle to a server relative uncompressed audio data or audio data compressed by other compression approaches. The electric vehicle can cause the audio data to be sparse, such as by capturing audio samples that are devoid of radio noise, wind buffeting, and other ambient signals (e.g., by collecting the audio data based on a condition of a window, radio or other vehicle parameter). The electric vehicle can cause the audio signature to be present such as by monitoring or engaging a drive unit component (e.g., recording audio responsive to a state of a left rear motor being active or engaged during an attempt to capture audio data from a left rear motor).

At least one aspect is directed to a system including a data processing system having one or more processors, coupled with memory. The data processing system can receive audio data captured via a sensor from an electric vehicle via a network. For example, the sensor can be a microphone located in the electric vehicle. The audio data can include a predetermined number of samples. The samples of the audio data can have non-uniform periodicity. The predetermined number of samples can be indicative of performance of an electric component of the electric vehicle. The data processing system can detect a change in the performance of the electric component based on a comparison of the audio data with an audio signature corresponding to the electric component of the electric vehicle. The data processing system can provide a notification to change the performance of the electric component. For example, the notification can be to inspect the electric component, service the electric component, or otherwise adjust the electric component. The notification can be received via the network in response to the detection of the change in the performance of the electric component.

At least one aspect is directed to a system including a data processing system having one or more processors, coupled with memory. The data processing system can receive audio data captured via a sensor associated with an electric vehicle. The audio data can be captured from an electric vehicle via a network. The audio data can be indicative of a performance of an electric component of the electric vehicle. The data processing system can detect a change in the performance of the electric component. The detection can be based on a comparison of the audio data with an audio signature corresponding to the electric component of the electric vehicle. The data processing system can provide a notification indicative of the change in the performance of the electric component. The notification can be provided via the network and responsive to the detection of the change in the performance of the electric component.

At least one aspect is directed to a method performed by a data processing system. The data processing system can include one or more processors coupled with memory. The method can include receiving audio data captured via a microphone located in an electric vehicle over a network. The audio data can include a predetermined number of samples. The audio data can be indicative of performance of an electric component of the electric vehicle. The method can include detecting a performance of the electric component. The performance can be detected based on a comparison of the audio data with an audio signature corresponding to the electric component of the electric vehicle. The method can include providing a notification to service the electric component. The notification can be provided via the network and responsive to the detection of the performance of the electric component.

At least one aspect is directed to a method performed by a data processing system. The data processing system can include one or more processors coupled with memory. The method can include receiving, from an electric vehicle via a network, audio data captured via a sensor associated with the electric vehicle. The audio data can be indicative of a performance of an electric component of the electric vehicle. The method can include detecting the performance of the electric component. The detection can be based on a comparison of the audio data with an audio signature corresponding to the electric component of the electric vehicle. The method can include providing, via the network and responsive to the detection of the performance of the electric component, a notification to service the electric component.

At least one aspect is directed to a method performed by a data processing system. The data processing system can include one or more processors coupled with memory. The method can include receiving audio data captured via a microphone over a network. The audio data can include a predetermined number of samples having a non-uniform periodicity. The audio data can be indicative of performance of a component. The method can include detecting a performance of the component. The performance can be detected based on a comparison of the audio data with an audio signature corresponding to the performance of the component. The method can include providing a notification to service the component. The notification can be provided via the network and responsive to the detection of the performance of the component.

At least one aspect is directed to a method performed by a data processing system. The data processing system can include one or more processors coupled with memory. The method can include receiving, via a network, audio data captured via a sensor. The audio data can be indicative of a performance of a component. The method can include detecting, based on a comparison of the audio data with an audio signature corresponding to the component, the performance of the component. The method can include providing, via the network and responsive to the detection of the performance of the component, a notification to service the component.

At least one aspect is directed to an electric vehicle having one or more processors, coupled with memory, an interface to a network, a passenger cabin, and a microphone. The electric vehicle can receive a call for audio data from a data processing system. The electric vehicle can capture the audio data via a microphone located in the passenger cabin. The audio data can include a predetermined number of samples indicative of performance of an electric component of the electric vehicle. The electric vehicle can detect a state of the electric vehicle. The electric vehicle can provide the audio data and the state of the electric vehicle to the data processing system. The audio data and the state of the electric vehicle can be provided via the network and responsive to the call for audio data.

At least one aspect is directed to a method including providing an electric vehicle having one or more processors, coupled with memory, an interface to a network, a passenger cabin, and a microphone. The electric vehicle can receive a call for audio data from a data processing system. The electric vehicle can capture the audio data via a microphone located in the passenger cabin. The audio data can include a predetermined number of samples indicative of performance of an electric component of the electric vehicle. The electric vehicle can detect a state of the electric vehicle. The electric vehicle can provide the audio data and the state of the electric vehicle to the data processing system. The audio data and the state of the electric vehicle can be provided via the network and responsive to the call for audio data.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
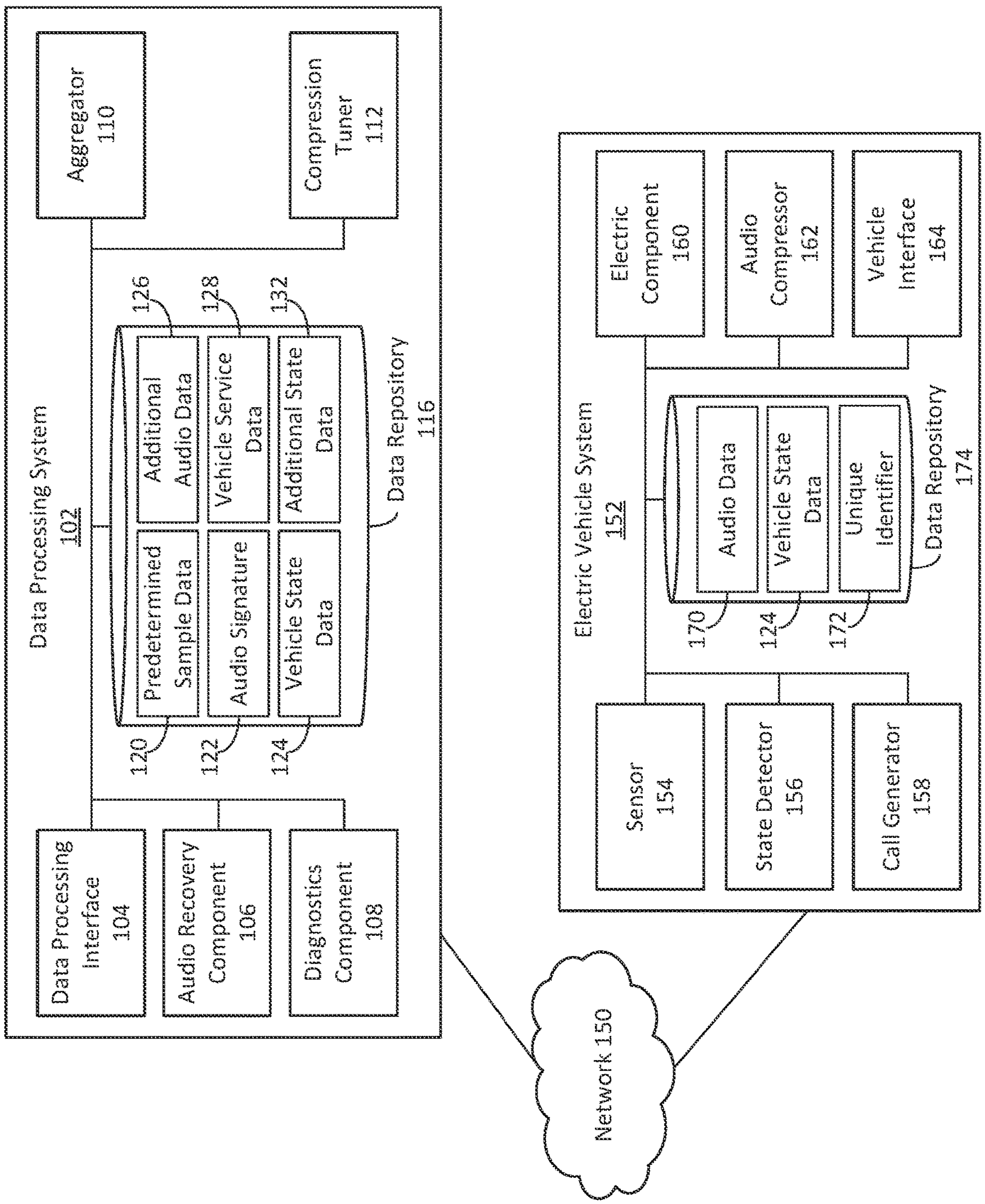
FIG. 1 depicts a system to monitor performance of electric vehicle components via tonal analysis, in accordance with some aspects.

Following below are more detailed descriptions of various concepts related to, and implementations of, methods, apparatuses, and systems of monitoring performance of electric vehicle components using tonal analysis. The various concepts introduced above and discussed in greater detail below may be implemented in any of numerous ways.

This disclosure is directed to monitoring performance of electric vehicle components using tonal analysis. For example, systems and methods of this disclosure can monitor, determine, identify or diagnose performance of electric components (e.g., drive unit, inverter, electric motor, or gearbox) in an electric vehicle based on audio data captured by an in-cabin microphone. However, it can be computationally challenging or inefficient to perform audio processing on an electric vehicle to determine the performance of the electric component, and transmitting the captured audio data to a server over a network can consume excessive network bandwidth resources or introduce delays or latency. Thus, this technical solution can: 1) detect whether to capture audio using a sensor in the electric vehicle (e.g., the in-cabin microphone) based on a state of the electric vehicle, and 2) apply a compression technique to reduce the size of the audio file (e.g. by a ratio of 1:9) before transmitting the file to a server for further processing. The technology can compress the audio data using non-uniform sampling points, such as randomly distributed sampling points. The selection of these sampling points (e.g., their number and distribution) can result in compressed audio data containing recoverable tonal data which has one or few fundamental frequencies. Sampling points can be defined to hamper reconstruction of content of human conversation (e.g. voice or speech). For example, an electric motor can exhibit an audio signature indicative of an action to be performed on the electric motor to adjust or maintain the performance of the electric motor. The audio signature can include audio components at frequencies of 360 Hz and 1,440 Hz. The time at which the audio samples are taken can be selected based on a location, a speed, or a number of hours or miles of operation. The audio microphone can sample the data at a native rate such as about 44.1 KHz. The electric vehicle can subsample the native rate to reduce processing operations, data size, or to focus on a subset of frequencies of interest. For example, the frequency can be subsampled to about 8 kHz. If a desired sample time is one second, about 8,000 samples can be collected. The system can use a function to randomly select audio samples over a time interval. For example, about 450 samples over a second can be taken and there can be a non-uniform time interval between two or more of the 450 samples (e.g., the time interval between the 450 samples may not be periodic, constant, or uniform).

Since a relatively small subset of samples can be extracted to generate the compressed audio data, the audio data file can occupy less storage space and use less network bandwidth to transmit to a remote computing device or server. The audio samples can be processed to recover tonal content of the data. For example, the tonal content can include an audio signature of 360 Hz and 1,440 Hz present in the recovered audio data. The compression (e.g., the selection of the 450 random samples) can remove audio data that is irrelevant, unnecessary or otherwise not used to diagnose the performance of the electric vehicle, while preventing the recovery of such data subsequent to compression. For example, the compression technique of this technical solution can hamper or prevent the recovery of any speech that may have been present in the native recording made via the microphone. Thus, by using non-uniform sampling and obtaining a relatively small number of samples, this technology can improve privacy or security by filtering out any speech or by rendering the content or words in any speech audio unrecoverable or undecipherable by a remote system.

To do so, the systems and methods of this disclosure can convey tonal information from an electric vehicle. The tonal information can be compared to an audio signature associated with the performance of various components thereof. For example, mechanical and electrical components can be characterized according to an audio signature which can be associated with additional information. The tonal information can be compressed and recovered by compressed sensing. For example, non-uniform samples can be taken which can increase a difficulty of recovering non-sparse (e.g., non-tonal) information. The compressed audio data can be transmitted across a network for analysis.

The disclosed solutions can have technical advantages of reduced audio data file size (e.g., compared to an uncompressed original file size or non-lossy compression) which can aid in transmitting the data (e.g., over low bandwidth networks). The reduced file size can also ease data sharing, analysis, or controls. For example, data can be retained based on the reduced file size and content thereof.

Systems and methods of the present technical solution can include an electric vehicle having a plurality of components including a sensor such as a microphone or accelerometer, a data processing system, and an electric vehicle. The electric vehicle can sample audio data for compression, such as by a receipt of audio data parameters (e.g., a number of samples) and transmit the compressed audio data (e.g., tonal data) over a network. The electric vehicle can receive a transmission responsive to the tonal data and containing information or instructions concerning the performance of a component of the electric vehicle.

FIG. 1 depicts an example system 100 to monitor performance of electric vehicle components via tonal analysis, in accordance with an implementation. The system 100 can include, interface with or otherwise communicate with a data processing system 102. The system 100 can include, interface with or otherwise communicate with an electric vehicle system 152. The data processing system 102 can communicate with the electric vehicle system 152 via network 150. The network 150 can include computer networks such as the Internet, local, wide, metro, or other area networks, intranets, cellular networks, satellite networks, and other communication networks such as voice or data mobile telephone networks. The network 150 can be public or private.

The system 100 can include an electric vehicle system 152. The electric vehicle system 152 can be part of an electric vehicle, such as electric vehicle 300 depicted in FIG. 3. The electric vehicle system 152 can include at least one vehicle interface 164. The electric vehicle system 152 can include at least one sensor 154, such as a microphone, sound meter, or transducer. The electric vehicle system 152 can include at least one state detector 156. The electric vehicle system 152 can include at least one call generator 158. The electric vehicle system 152 can include at least one electric component 160. The electric vehicle system 152 can include at least one audio compressor 162.

The sensor 154, state detector 156, call generator 158, audio compressor 162 or vehicle interface 164 can each include at least one processing unit or other logic device such as programmable logic array engine, or module configured to communicate with the database repository 174 or database. The sensor 154, state detector 156, call generator 158, audio compressor 162, or vehicle interface 164 can be separate components, a single component, or part of the electric vehicle system 152. The electric vehicle system 152 can include hardware elements, such as one or more processors, logic devices, or circuits. For example, the electric vehicle system 152 can include one or more component, structure of functionality of computing device depicted in FIG. 10.

The data repository 174 can include one or more local or distributed databases, and can include a database management system. The data repository 174 can include computer data storage or memory and can store one or more of audio data 170, vehicle state data 124, or a unique identifier 172. The audio data 170 can include audio signals, acoustic signals, tonal data, or other information captured by a sensor 154 (e.g., a microphone or a transducer). The audio data 170 can include digital audio files and a time stamp or other information or metadata associated with the audio signal. The audio data 170 can include a plurality of samples or of an audio recording of the electric vehicle. The vehicle state data 124 can include information associated with a state of the electric vehicle. The state of the electric vehicle can be associated with or correspond to the audio recording. For example, the vehicle state data 124 can include a speed with which the vehicle is traveling at the time of the audio recording, a location of the vehicle, acceleration of the vehicle, altitude of the vehicle, a temperature of a component of the vehicle, an ambient temperature, an environmental temperature, weather information, humidity information, precipitation information, or odometer information. The vehicle state data 124 can include conditions or parameters associated with the electric vehicle. The unique identifier 172 can include, for example, a vehicle identification number (VIN), username, make, model or year of the electric vehicle, or other identifying information. The unique identifiers 172 can include an identifier of the electric vehicle which is particular to one electric vehicle such as a session key.

The electric vehicle system 152 can include at least one vehicle interface 164 designed, constructed and operational to transmit audio data 170, such as tonal data from one or more electric vehicles (e.g., responsive to a call generator 158 of the electric vehicle). For example, the electric vehicle system 152 can convey a file containing tonal data over the network 150 to the data processing interface 104. The electric vehicle can include or be collocated with one or more components of the data processing system 102. For example, the electric vehicle system 152 can locally interface to the data processing interface 104.

The vehicle interface 164 can provide one or more parameters of the state of the electric vehicle can be provided along with the tonal data. For example, the power applied to or from devices such as batteries, inverters, or motors can be presented with the data. Angle or phase information can be included, such as by providing the tonal data with respect to the phase angle, or by providing vehicle speed information. Additional parameters can include an open or closed state of windows, or a state of an heating ventilation and cooling system (HVAC). The electric vehicle can provide a standard suite of parameters responsive to every capture of audio data 170, or can provide additional or fewer parameters responsive to a request, or user preference. For example, a request for a state of a seat motor can be received by an electric vehicle, or a user associated with an electric vehicle can select parameters to exclude. For example, a user can indicate that speed should not be transmitted from the electric vehicle. Some information can be anonymized. For example, location information can be included at a course level (e.g., a state or other municipality, a region, or a climate zone). Such anonymized information can provide useful information (such as salt content, average humidity, or temperature a vehicle is or can be exposed to).

The electric vehicle system 152 can include at least one sensor 154. Sensors 154 can include, for example, a microphone, transducer, temperature sensor, accelerometer, gyroscope, or location sensor. For example, the sensor 154 can include a microphone. The microphone can be condensing microphone that can use a variable capacitor in which movement of a mechanical portion adjusts the distance of two conductors which can be sensed according to a change in capacitance. A dynamic microphone can include a mechanical portion which is displaced by a pressure wave. The pressure wave can displace the coil resulting in a measureable current. Microphones and other sensors can be tuned, configured or optimized for frequency ranges, directions, or amplitudes. Some microphones can be comprised of additional elements. For example, two or more microphones can determine location a direction of a sound based on a time delay of the pressure wave to the respective sensors.

The electric vehicle system 152 can include at least one state detector 156. The state detector 156 can determine the state of the vehicle. The state of the vehicle can be used by the call generator 158 to generate a call to record or capture audio data. The state detector 156 can be designed, constructed or operational to determine, detect, or otherwise identify the state of the vehicle or one or more components thereof. For example, the state detector 156 can determine the vehicle speed, vehicle acceleration, uphill or downhill travel, braking, traffic pattern, whether windows are open or closed, whether the radio is on or off, or level of ambient noise.

To do so, the state detector 156 can interface with or be communicatively coupled to one or more on-board computing units of the electric vehicle. The state detector 156 can ping, or poll interfaces associated with components of the electric vehicle to obtain the state information. For example, the state detector 156 can poll or query a window management unit to determine the state of the windows of the vehicle (e.g., open or closed). The state detector 156 can poll or query an entertainment unit or audio system of the electric vehicle to determine whether the speakers of the electric are playing audio (e.g., radio, music, or other audio content). The state detector 156 can poll or query other sensors of the electric vehicle, such as location sensors, accelerometers, gyroscopes, or temperature sensors.

The electric vehicle system 152 can include at least one call generator 158 designed, constructed or operational to generate or provide a call, indication, or other instruction or command to cause the sensor 154 to record or capture audio data. The call generator 158 can be programmed to generate a call to capture audio data based on one or more factors or conditions. For example, the call generator 158 can generate the call based on the speed of the vehicle satisfying a threshold (e.g., being greater than or equal to a threshold, or being less than or equal to a threshold). For example, the call generator 158 can command the sensor 154 to record audio data for 30 seconds when the speed of the vehicle reaches 35 miles per hour. The call generator 158 can generate the call when additional conditions or constrains are satisfied. For example, the call generator 158 can compare the current state of the vehicle detected by the state detector 156 with a state constraint. The state constraints can include, for example, windows closed and audio system turned off. Thus, the call generator 158 can command the sensor 154 to record or capture audio data responsive to the vehicle speed exceeding 35 miles per hour and the windows being closed and the audio system being turned off. The call generator 158 can use constraints such as temperature, altitude, location, or time since last recording. In some cases, a user or driver of the vehicle can authorize audio recording during certain time intervals or days, in which case the call generator 158 can generate the call during the authorized time windows. The call generator 158 can provide a prompt to the driver via a user interface of the electric vehicle (e.g., graphical user interface 405 depicted in FIG. 4), and generate the call responsive to receiving an authorization from via the graphical user interface.

For example, the audio data 170 of the vehicle can be requested to be captured at a time when the audio system is not playing music, and is not connected to a cellular telephone call. The audio data 170 can be requested at a particular speed or other operating condition. For example, a plurality of audio data 170 can be requested as a prognostic/diagnostic program for a plurality of operating conditions. For example, audio data measurements can be taken at one or more speeds, one or more power levels (e.g., maximum or minimum acceleration, maximum or minimum breaking, maximum or minimum regenerative braking), one or more inclinations or declinations, and various combinations of these and other parameters of the vehicle state data 124.

The call for tonal or audio data 170 can be responsive to one or more states of the electric vehicle. For example, the data processing system 102 can be in communication with the electric vehicle. The data processing system 102 can receive one or more states of the electric vehicle (e.g., over the network 150). For example, the communication can be responsive to a prognostics or analytics system. For example, the electric vehicle can provide analytics data to a data processing system 102 indicating a condition associated with one or more components of the electric vehicle. The data processing system 102 can initiate a call for tonal data responsive to the receipt of the condition. The call generator 158 of the electric vehicle system 152 can generate a responsive call for tonal data including specifications for the tonal data (e.g., a number of sample points, a sample time, a sample speed, or a vehicle state) responsive to the condition. For example, if a receipt of a condition is associated with an HVAC pump, the audio sample parameters can be selected based on one or more audio signatures 122 associated with the HVAC pump.

The call can include one or more states of the electric vehicle. For example, the call can contain one or more requested parameters of the electric vehicle 300. For example, if the request relates to an HVAC pump, the parameter can specify that the pump is engaged while collecting the audio data. The call can include a state for the user to enter the vehicle into, or can specify a state that may not be reached during normal operation. For example, a pump typically operating in conjunction with a fan, can disable the fan to collect the tonal data.

The call generator 158 can generate calls for audio data 170 including or requesting user approval based on a change of operation of the electric vehicle 300. For example, a call for tonal data can include a request that only the front motor or only the rear motor be active (e.g., to allow the sensor 154 to discriminate between the motors), or can require that all windows 320 be closed (to minimize wind noise). The call for tonal data can be presented to a user associated with the electric vehicle 300. For example, the user can accept the call for tonal data and the electric vehicle 300 can manage the electric vehicle state responsive to the acceptance, or the user can manage the state, responsive to the presentation of the state requirements (e.g., the user can close a window of the vehicle based on a displayed message 420).

The electric vehicle system 152 can include at least one electric component 160. The electric component 160 can include, for example, an electric drive unit, motor, or gearbox. The electric components 160 can emit tonal data indicative of the performance of one or more electric components 160. For example, the audio data can indicate rotor or wire fatigue, brush wear, bearing or lubricant status, or the presence of foreign material such as dust. The performance can be related to an electric motor such as a propulsion motor, a window or seat control motor, a motor or pump of an HVAC system, or other electric vehicle components. The tonal data can indicate a current or predicted performance of the component. The tonal data can be indicative of the performance of stationary components. For example, a solid state inverter, transformer, or capacitor can be associated with an audio signature indicative of performance (e.g., based on the rotation of a phase angle associated with power delivered to or from the component). For example, the audio signature 122 can be indicative of normal operation, low voltage, or other conditions. The tonal data can be indicative of the performance of one or more mechanical components of the electric vehicle. For example, performance of wheel bearings, suspension components, or motor mounts can be detected from recovered tonal components.

The electric vehicle system 152 can include at least one audio compressor 162. The audio compressor 162 can be configured with, include, or perform one or more compression techniques or function. For example, the audio compressor 162 can compress audio data using a lossy compression function. For example, the compression function can result in compressed audio data containing less total information than the original data recorded by sensor 154 (e.g., the audio data present in the vehicle or captured by a microphone). For example, high frequency components of the audio data can be lost because the audio samples (e.g., audio samples 515 depicted in FIG. 5), which can prevent these components of the audio from being reconstructed or recovered by the data processing system 102. The lost components can vary based on the duration a signal is present for and other signals present (e.g., sparsity). For example, a signal that is present for an entire time of the audio data 170 can be more likely to be reconstructed than a signal that is present for a lesser portion of the time.

The audio compressor 162 can reversibly compress tonal information. The tonal information includes one or more frequencies. For example, a tuning fork can produce audio data 170 dominated by a single frequency (e.g., 1.2 kHz). Other devices and components have two, three, four, five, six, seven, or more frequencies. If the fundamental frequency or other harmonics are present for a sufficient period of time, the frequency can be reconstructed by compressed sensing techniques. These techniques can enable the recovery of the tuning fork frequency without regard to whether the Nyquist criterion is met. For example, if the 1.2 kHz signal is sampled for about ten minutes, the signal can, in some instances, be reconstructed based on a random sample taken about once per second.

The audio compressor 162 can irreversibly compress (e.g., remove or delete, or transform) human speech content (e.g., a person present in the vehicle or communicating by telephone). Human speech can include intonations, words, languages, or other elements which may not be recoverable based on the sparse tonal data recovery having at least some sample rates and parameters. In a system containing both human speech and tonal data, the compression function can reversibly compress tonal data which can be indicative of one or more audio signatures 122 of interest and irreversible compress human speech. Thus, data of interest (e.g., audio signatures indicative of performance of an electric component of the electric vehicle 300) can be captured and transmitted to the data processing system 102, without transmitting other audio that may not be indicative of the performance of the electric component of the electric vehicle 300.

One or more parameters of the state of the electric vehicle can be provided along with the tonal data. For example, the power applied to or from devices such as batteries, inverters, or motors can be presented with the data. Angle or phase information can be included, such as by providing the tonal data with respect to the phase angle, or by providing vehicle speed information. Additional parameters can include an open or closed state of windows, or a state of an heating ventilation and cooling system (HVAC). The electric vehicle can provide a standard suite of parameters responsive to every capture of audio data 170, or can provide additional or fewer parameters responsive to a request, or user preference. For example, a request for a state of a seat motor can be received by an electric vehicle, or a user associated with an electric vehicle can select parameters to exclude. For example, a user can indicate that speed should not be transmitted from the electric vehicle. Some information can be anonymized. For example, location information can be included at a course level (e.g., a state or other municipality, a region, or a climate zone). Such anonymized information can provide useful information (such as salt content, average humidity, or temperature a vehicle is or can be exposed to) in accordance with a privacy concern.

The data processing system 102 can include at least one data processing interface 104. The data processing system 102 can include at least one audio recovery component 106. The data processing system 102 can include at least one diagnostics component 108. The data processing system 102 can include at least one aggregator 110. The data processing system 102 can include at least one compression tuner 112. The data processing system 102 can include at least one data repository 116.

The data processing interface 104, audio recovery component 106, diagnostics component 108, aggregator 110, or compression tuner 112 can each include at least one processing unit or other logic device such as programmable logic array engine, or module configured to communicate with the database repository 116 or database. The data processing interface 104, audio recovery component 106, diagnostics component 108, aggregator 110, or compression tuner 112 can be separate components, a single component, or part of the data processing system 102. The data processing system 102 can include hardware elements, such as one or more processors, logic devices, or circuits. For example, the data processing system 102 can include one or more component, structure of functionality of computing device depicted in FIG. 10.

The data repository 116 can include one or more local or distributed databases, and can include a database management system. The data repository 116 can include computer data storage or memory and can store one or more of predetermined sample data 120, audio signature 122, vehicle state data 124, additional audio data 126, vehicle service data 128, or additional state data 132. The predetermined sample data 120 can include information relating to a number or dispersion of sample points for an audio sample. The audio signature 122 can include audio data indicative of a performance of a component. The vehicle state data 124 can include information related to the state of an electric vehicle. The additional audio data 126 can include audio data associated with a plurality of additional electric vehicles. The vehicle service data 128 can include a records of vehicle service visits, procedures, or inspections for various electric vehicles. The additional state data 132 can include state data associated with the plurality of additional electric vehicles.

Thus, the electric vehicle system 152 can capture, generate, construct or otherwise package audio data 170 and vehicle state data 124. The electric vehicle system 152, via the vehicle interface 164, transmit the audio data 170 (or compressed audio data 170) and the vehicle state data 124 to the data processing system 102 via network 150. The electric vehicle system 152 can construct one or more data packages or data structures with the compressed audio data and state data for transmission to the data processing system 102 via network 150.

The data processing system 102 can receive, from the electric vehicle via network 150, audio data captured via a sensor 154 associated with the electric vehicle. The audio data can be indicative of a performance of an electric component 160 of the electric vehicle. For example, the data processing system 102 can include at least one data processing interface 104 designed, constructed and operational to receive audio data 170. The audio data 170 can include, for example, tonal data from one or more electric vehicles. For example, an electric vehicle system 152 can record the audio data 170 responsive to a call from a call generator 158 of the electric vehicle system 152, compress the recorded data, and then transmit the compressed audio data to the data processing system 102. The data processing system 102 can receive a file containing tonal data over the network 150 via the data processing interface 104. A file can be received from the electric vehicle, a mobile device associated with the electric vehicle, or another device associated with the electric vehicle. The audio data 170 (e.g., from a sensor 154 or accelerometer associated with an electric vehicle) can be retrieved via an on board diagnostics (OBD) port, a cellular network, a Wi-Fi network, a Bluetooth network, or another network. The audio data 170 can be associated with information or metadata corresponding to the electric vehicle, state information, or environmental information associated with the audio recording. For example, the audio data 170 can be packaged or otherwise correlated with information such as an identifier of the electric vehicle, odometer information, speed of the electric vehicle during the audio sample, tire pressure, location of the electric vehicle, temperature information, altitude information, weather information, humidity information, or precipitation information.

The data processing interface 104 can receive information from additional electric vehicles. For example, additional audio data 126, parameters of vehicle state data 124 (as detected by a vehicle state detector 156), or vehicle service data 128 for additional electric vehicles can be received. The information can be received over the network 150, from a service center, or from an electric vehicle system 152. The additional state data 132 can include information on one or more additional states of the additional electric vehicles. The additional state data 132 can be paired to the information received from the electric vehicle system 152 for comparison. State data can include any information associated with the vehicle. For example, state data can include vehicle speed, power output of one or more motors, batteries, or inverters, miles or hours of operation, a unique identifier 172 or a location. The data processing system can include an aggregator 110 to aggregate vehicle state data from the electric vehicle, and the plurality of additional electric vehicles (e.g., for comparison).

The data processing interface 104 can receive service data (e.g., service records) from the additional electric vehicles or another source, such as a service shop by a diagnostics component 108 of the data processing system. Service data can include audio data 170 of a vehicle in a previous state (e.g., as originally manufactured), a history of component replacements, part numbers, versions, or suppliers. Vehicle service data 128 can include maintenance performed on a vehicle, such as replacement of suspension components, motors, bearings, or programmatic instructions. Service records can include activities performed on the electric vehicle or components thereof information. Service records can include baseline vehicle performance metrics. For example, a noise level, battery power level, motor power level, or thermal data of one or more components can be established for a vehicle, such as before or after customer acceptance of the vehicle (e.g., at a location of manufacture or at a location of operation).

The data processing system 102 can include at least one audio recovery component 106 to recover audio information from the audio data 170 received by the data processing interface 104. The audio data 170 can be provided by the audio compressor 162 of the electric vehicle. The audio signatures can include or indicate information about the performance of an electric component of the electric vehicle. The audio signature can include frequencies of interest. In some cases, the audio signatures can include frequencies that satisfy the Nyquist criterion (e.g., a maximum sampling frequency in excess of double a frequency of interest). For example, the maximum or average sampling frequency can be less than double a frequency of interest, less than a frequency of interest, or less than half of a frequency of interest. Compression sensing can sample a sufficiently sparse signal for a sufficiently long time to store the tonal data. For example, a 1 Hz sine wave can be recovered by an audio recovery component 106 of the data processing system 102 via compressed sensing by constraining (e.g., presuming or verifying) the sparseness of the signal, and taking a sample over a long enough period of time to re-create the waveform. For example, 200 random samples points over a 10 minute total sample time (e.g., having a non-uniform periodicity) have an average periodicity of about 3 seconds, and thus the Nyquist criterion indicates data in excess of ⅙ Hz may not be accurately reconstructed. However, the 1 Hz sparse signal can be reconstructed, such as by presuming sparseness and fitting one or more frequencies to the sample data (e.g., in a Fourier domain). The number of samples can be based on predetermined sample data 120 which can be adjusted by a compression tuner 112 of the data processing system 102.

The data processing system 102 can include at least one diagnostics component 108 to detect a change in performance of a component. The diagnostics component can derive audio signatures 122 from the information of one or more electric vehicles. For example, audio signatures 122 can be associated with vehicle service data 128 (e.g., replacement, servicing, or inspection of components). The audio signatures 122 can be associated with vehicle state data 124. For example, a wear life of a component can be estimated based on vehicle state data 124. For example, the electric component can have audio signatures 122 corresponding to different numbers of miles driven, such as an audio signature corresponding to 10,000 miles, 20,000 miles, 30,000 miles, 50,000 miles, 75,000 miles, 100,000 miles, 125,000 miles or other mileage intervals. The data processing system 102 can compare the audio signature with an expected or desired audio signature based on a number of miles driven. The audio signatures 122 can be derived based on the additional vehicle state data 124.

The diagnostics component 108 can compare tonal data to one or more audio signatures 122. For example, the diagnostics component 108 can compare the tonal data to a database of one or more audio signatures 122. The comparison can be based on a pre-quantified audio signature 122 having a range of frequencies and amplitudes associated therewith. The audio signatures 122 can be based on vehicle service data 128 associated with additional vehicles, or test data associated with components. Audio signatures 122 can be absolute or based on relative shifts. For example, an increase of an amplitude of an audio signature 122 can be associated with a component requiring service (e.g., more so than an absolute amplitude of the audio signature 122). The compared audio signatures 122 can be recorded in the same electric vehicle (e.g., at another time or in another state.) The compared audio signatures 122 can be recorded in another vehicle (e.g., can be indicative of a performance of the component of the electric vehicle having meeting one or more thresholds associated with comparing audio signatures 122.

The diagnostics component 108 can compare the audio signatures 122 to the tonal data by ingesting the tonal data into a machine learning system having ingested audio signatures 122 of additional audio data 126 (e.g., tonal data) from the additional electric vehicles. The machine learning system can correlate audio signatures 122 of the various inputs based on service records or other information associated with the vehicles. For example, an audio signature 122 can be associated with a service of a part. The data processing system 102 can provide an indication to manage or adjust performance of use of the electric component 160 responsive to the comparison of the received audio data with an audio signature 122. For example, a component can have performance indications associated with a predetermined number of miles which can be higher or lower than a fleet average. The fleet can include all vehicles of a vehicle model, or vehicles classed according to a region, climate, use case, or other criteria. For example, commercial vehicles, vehicles having a number of miles within a same tranche, operating hours, lifetime power use, or vehicles having a particular part model number can be classified.

The data processing system 102 can include at least one aggregator 110 to determine the audio signature 122 based on the additional audio data and the vehicle service data. The aggregator can determine an audio signature 122 based on additional audio data 126 and the vehicle service data 128. For example, an audio signature 122 corresponding to a rear electric motor can be based on the operation of the rear electric motor and the non-operation of the front electric motor. The audio signature 122 can be based on a customer type, a manufacturer of a component, a model or revision of a vehicle or component, or vehicle state data 124. For example, a first audio signature 122 of an vehicle component of a first manufacturer can differ from a second audio signature 122 of a second manufacturer. For example, a first manufacturer can indicate a steeper wear curve than a second manufacturer, or a wear curve can differ in amplitude or frequency. The audio signature 122 can vary based on an ambient or cabin temperature, a window state, or other vehicle state data 124. For example, the audio signature 122 can be faint if windows are lowered at speed because the wind noise can render the audio data 170 non-sparse.

The data processing system 102 can include at least one compression tuner 112 to determine a number or dispersion of samples of the audio data. The compression tuner 112 can modify or adjust the compression technique or function used by the audio compressor 162 of the electric vehicle system 152 to compress the audio data 170 captured by the sensor 154. For example, the compression tuner 112 can provide one or more updates to the number of random sample points or otherwise provide compression tuning parameters (e.g., a collection time or domain). For example, the compression tuner 112 can increase the number of random sample points can improve the detectability of an audio signature associated with a component of the electric vehicle. The compression tuner 112 can decrease the number of random sample points to reduce the file size of the audio data 170, which can reduce the amount of network bandwidth used during transmission of the audio data 170. An update associated with the compression tuner 112 can relate to the position of the samples. For example, a sample map can be provided to an electric vehicle wherein the number and position of sample points are provided.

The compression tuner 112 can provide a compression function having a number of random sample points. For example, the sample points as well as their position (e.g., dispersion, randomness, or entropy) can be specified, as determined by a random or pseudorandom generator. For example, the sample points can be generated having sample point locations specified according to a desired entropy to avoid capturing undesired data. The pre-location of the sample points can lower a bandwidth requirement (e.g., because one or more samples can be provided as a sequence or an array without time data, or with a pointer or seed which can be of smaller size than a complete list of data capture times). The compression function can specify that one or more sample points are generated by the electric vehicle (e.g., in order to increase data diversity, which can lead to the identification of additional audio signatures 122).

Figure 2:
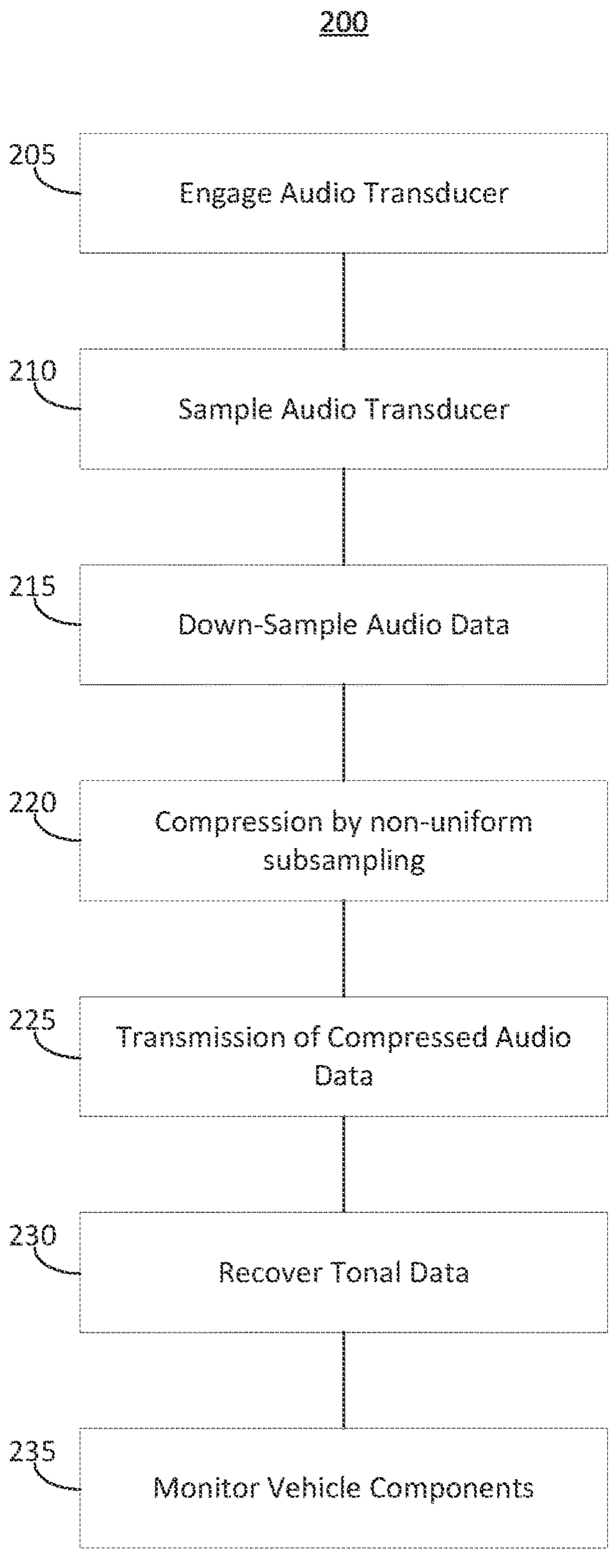
FIG. 2 is a flow diagram of a method for monitoring the performance of electric vehicle components via tonal analysis, in accordance with some aspects.

FIG. 2 is a flow diagram of a method 200 for monitoring the performance of electric vehicle components via tonal analysis, in accordance with an implementations. The method 200 can include compressed sensing applied to a sensor 154 of a passenger compartment of an electric vehicle, in accordance with some aspects. The method can be performed by one or more components or systems described in FIG. 1 or FIG. 10, including, for example a data processing system or an electric vehicle system.

At ACT 205, an audio transducer receives an audio signal. For example, the audio transducer can translate mechanical motion induced by a pressure wave to an electric signal. Various microphones, accelerometers (e.g., capacitive, piezo-electric, or piezo-resistance), or other sensors can employ various transducers.

At ACT 210, the audio transducer is sampled. For example, the electric output of the transducer can be sensed, recorded, converted, or stored. The sampling of the transducer can be responsive to a call for audio data. For example, the call generator 158 of the electric vehicle system 152 can generate a call responsive to a message received from the data processing system 102 or a initiate a call at the electric vehicle. The transducer can be sampled at a native frequency or at another frequency (e.g., can be down-sampled). The sample can be responsive to a call for data or can be continuous. For example, the audio transducer can be sampled and the audio data 170 can be stored (e.g., in a circular buffer). If a user notes a sound of interest, the user can elect to provide the audio data 170 (e.g., trailing audio data) to the data processing system 102 for analysis.

The sensor 154 can be sampled according to a call for data (e.g., from the call generator 158). For example, the transducer can be sampled directly at the native rate of the sensor 154 or the sensor 154 can be sampled at non-uniform periodicity. The sensor 154 can be sampled at a native rate and thereafter processed. The native rate of the sensor 154 can be conveyed to the data processing system 102. For example, a full-spectrum sample can be desired, or a sample being aligned to a plurality of angle domains can be selected. The full-spectrum data can be aligned to various angle domains (e.g., the angle domain of various fans of an HVAC system).

The electric vehicle can detect one or more calls for audio data 170. For example, the electric vehicle can receive a message from the data processing system 102. The message can include a request for tonal data. The request can include additional information such as parameters of the vehicle state data 124. For example, the request can include a desired state of the vehicle to collect the information, or information about the audio data such as predetermined sample data 120. For example, the period of time for the audio data 170, or the number or frequency of samples can be provided. One or more calls for tonal information can originate at the electric vehicle. For example, an electric vehicle can generate audio data 170 at regular interval, or responsive to a condition (e.g., during maximum acceleration, in response to a power output of a component, or in response to a change in efficiency of the electric vehicle). The call for tonal data can be responsive to a user preference. For example, a user can initiate a call for tonal data responsive to a sensed vibration, noise, harshness, or other condition, or can initiate a call responsive to no condition. For example, the user can manually initiate a health report of the vehicle which can include a call for tonal data via the center information display (CID) or a mobile device.

At ACT 215, one or more audio data 170 records can be down-sampled. For example, the audio can be down-sampled to a fixed or variable frequency. The audio frequency can be based on processing power, memory space, transmission bandwidth or other constraints of the electric vehicle. A down-sampled frequency can be selected by a user or a parameter. For example, a sample for a high frequency component can be down-sampled at a higher frequency (or this ACT can be omitted). For example, if an inverter operates in the tens of kHz range, a higher frequency of samples can be desired than for an inverter operating in the kHz range. For example, the audio data 170 can contain additional data, or can be taken from a shorter time period. The down-sampling can be a uniform down-sampling For example, the down-sampling can be uniformly taken over time, over the rotation of a component of the electric vehicle, or another input.

At ACT 220, the audio data can be compressed by non-uniform sampling. The audio data can be compressed such that the time intervals between samples is irregular. Irregular time intervals can refer to or include non-uniform periodicity of samples, non-uniform audio data distribution. Samples having irregular time intervals between them can include or refer to an asymmetrical audio data distribution pattern that renders certain audio content, such as speech, unrecoverable or undecipherable. For example, the data compression can be based on a randomization by the electric vehicle, responsive to the receipt of a random designation of a number of sample or location of samples from the data processing system, or can be a pseudorandom designation. A pseudorandom designation can include designations for a number and position of samples wherein an entropy of the collected audio data 170 is insufficient to reconstruct human conversation. For example, the samples can be or appear random with respect to a transform basis (e.g., a Fourier transform basis) to recover the tonal data from the audio data 170.

At ACT 225, the audio data 170 can be transmitted to a data processing system 102. For example, one or more files containing the audio data 170 can be transmitted to the data processing system. An electric vehicle can have one or more unique identifiers 172 associated therewith. For example, an electric vehicle can have a vehicle identification number (VIN) or another identifier such as a credential or signature. The files can contain the audio data 170 or additional parameters of the state of the vehicle including a unique identifier 172. The unique identifier 172 can be permanently associated with the vehicle (e.g., the VIN) or can be associated with the transmission of the files such as a session identification of the transmission session.

At ACT 230, tonal data can be recovered. For example, parameters the tonal data can be received and extracted from the compressed audio data 170 (e.g., tonal data) received by the audio recovery component 106 of the data processing system 102. The tonal data can include one or more frequencies and amplitudes thereof. A complete record of the recoverable tonal data can be recovered or constituent parts of the tonal data can be recovered. For example, the tonal data can be organized into a range of frequencies and amplitudes. A record can indicate that the audio data 170 contains tonal data of 150 Hz associated with an amplitude of between 35 decibels (dB) and 40 dB. For example, if an audio signature 122 for a comparison is predefined, a portion of the tonal data may not be of interest. For example, if no pre-defined audio signature 122 contains elements in excess of 5 kHz, no tonal data in excess of 5 kHz may be recovered, which can improve presumed sparsity and thereby improve the performance of the audio recovery component 106.

At ACT 235, vehicle components can be monitored based on the tonal data. The diagnostics component 108 can ingest the tonal information from the audio data 170 to identify audio signatures 122 corresponding to various component performance parameters (e.g., efficiency, wear, replacement, or inspection). The audio signatures 122 can be defined by any recoverable data from the audio signature 122, thus all amplitudes, frequencies, and angles can be of interest. For example, monitoring the vehicle components can include comparing the performance of the components to the performance of additional components based on the tonal data (e.g., based on audio signatures observable in the tonal data). Monitoring the vehicle components can include comparing the tonal data over time, over environmental changes, or over parameter changes (e.g., speed, power draw, or an angle of a component). The tonal data can be associated with the electric vehicle based on the unique identifier 172. For example, one or more unique identifiers 172 of an electric vehicle can be associated with one or more audio data 170 to associate the various tonal data with the electric vehicle. The performance of components of the electric vehicle can be determined based on changes in the tonal data. For example, changes in one or more tonal components can be indicative of a performance of various components of the electric vehicle. The changes in tone can be based on a change in temperature, miles or hours of operation, vehicle speed, time, location, or other parameters of or associated with the electric vehicle.

The data processing system or electric vehicle system can provide one or more actions. For example, responsive to a performance detection relating to a front motor of an electric vehicle, the power to one or more rear motors can be increased. Responsive to a performance of an inverter, a maximum power can be adjusted. The action that is provided can be taken transparently or presented to a user for approval or implementation. For example, a user can be informed of a selection of a mode, or can be prompted to accept or decline the setting. For example, a notification for service can be presented, and the user can elect to accept an operational change to the vehicle.

Figure 3:
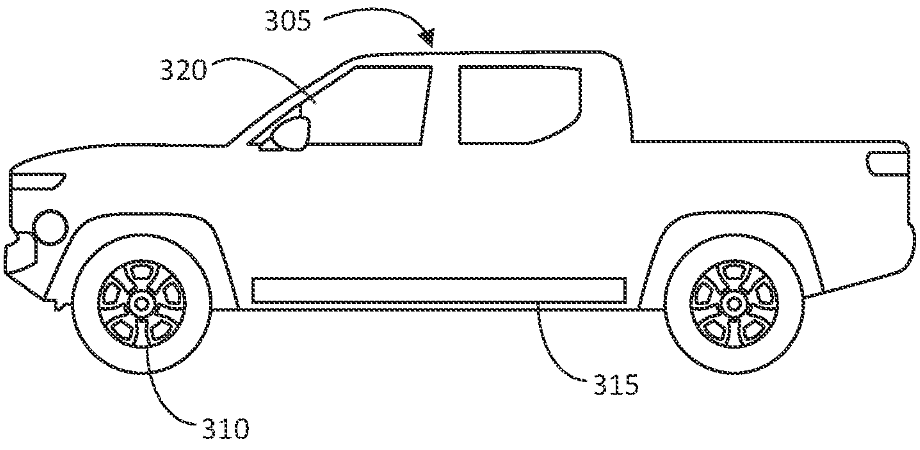
FIG. 3 is an electric vehicle, in accordance with some aspects.

FIG. 3 depicts an example electric vehicle 300, in accordance with an implementation. The electric vehicle 300 has a passenger cabin 305. The passenger cabin 305 contains one or more microphones 154 or other sensors. The sensors 154 can be located internal to the cabin, or external to the cabin. For example, the electric vehicle 300 can include one or more additional microphones 154 or other sensors which are not in the passenger cabin. For example, one or more microphones can be placed in or near an electric motor, wheel bed, or a chassis of the electric vehicle 300. The passenger cabin 305 can include one or more user interfaces. The user interface can be a graphical user interface including a display panel and one or more buttons, touchscreens, or other human interface devices (HMI) such as lights, speakers, or microphones.

The electric vehicle 300 can have a propulsion system including wheels 310 which are driven by one or more electric motors (e.g., electric components 160). One or more inverters or DC to DC converters can convert power between a battery pack 315, a charger, and the electric motor. For example, the inverter or DC to DC converter can charge the battery pack (e.g., from a charger or a regenerative braking circuit), power the propulsion electric motor, or provide power to additional components of the passenger cabin 305 of the electric vehicle 300.

The battery pack 315 can include a plurality of cells, cell balancing hardware, or a sensor suite reporting in the status of the battery pack 315 and associated components. The battery pack 315 can store energy, and the operations of the battery pack can be configured (e.g., in response to a user preference or another communication). For example, a maximum and minimum charge state can be established which can be relevant to the wear of the cells of the battery or of other components. The battery pack cells can include a thermal management system including a thermal management device. The battery pack 315 can be, include, or be subdivided into modules or submodules which can include or be associated with battery cells and thermal management systems. Each battery pack 315, module, or submodule can include a plurality of cells such as prismatic, cylindrical, rectangular, square, cubic, flat, or pouch form factor cells.

Figure 4:
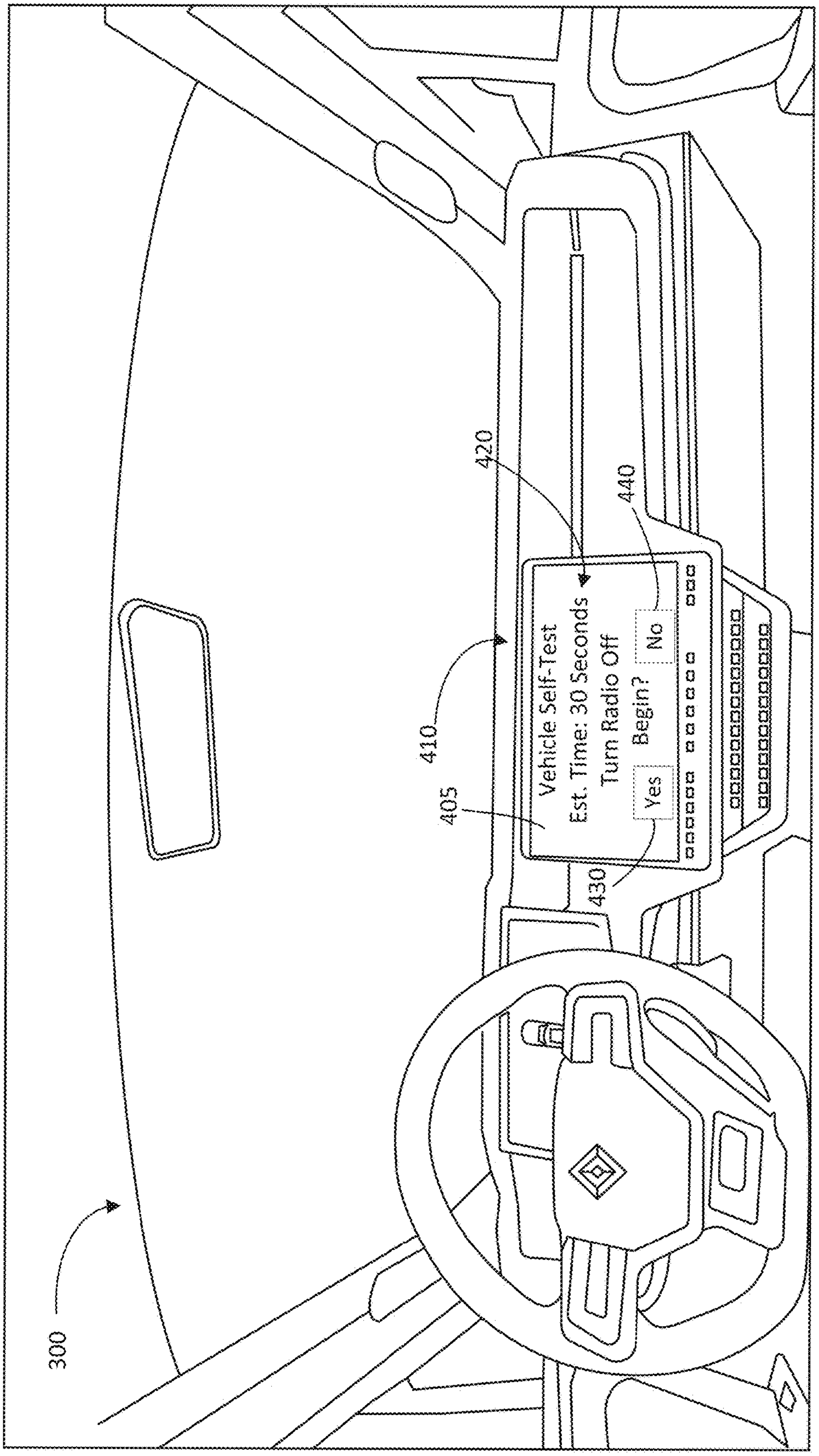
FIG. 4 is illustrates a graphical user interface to monitor performance of electric vehicle components using tonal analysis, in accordance with some aspects.

FIG. 4 is another view of the electric vehicle 300, in accordance with some aspects. The electric vehicle 300 can include or be associated with one or more user interfaces (e.g., graphical user interfaces 405). For example, a graphical user interface 405 can be provided on an CID 410 of the electric vehicle 300 or a mobile device associated with the electric vehicle 300 (e.g., a laptop computer or a cellular device). The electric vehicle system 152 can provide the graphical user interface 405.

One or more parameters such as a state for collecting tonal data can be provided. For example, a parameter can specify that the radio should not be engaged for collection of the audio data (e.g., playing music or connected to a mobile device for a cellular audio call) or an occupancy status can be provided. The electric vehicle 300 can monitor the state and capture the audio data upon the one or more state conditions being met (e.g., by the call generator 158). For example, the call for audio data can be received at a first time, wherein the electric vehicle can determine that the vehicle state for collection cannot be validated. The electric vehicle can monitor the state of the vehicle until the vehicle is validated to match the desired state conditions whereupon the electric vehicle can generate a call for tonal data by the call generator 158.

The graphical user interface 405 can provide a notification (e.g., based on a tone, an audio message, or a displayed message 420) that audio data is intended for collection or being collected. For example, if the state conditions are not met (e.g., within a number of operating miles or hours, or a time), the requested state can be presented to the user. For example, if a radio should be in an off position to sample the audio data 170, the user can be presented with a prompt to turn the radio off 430 or a prompt to decline the tonal data gathering 440. The user can request to be provided a notification of all audio collection (e.g., according to a user preference). The audio data can proceed with or without user feedback, such as according to a user preference. For example, an indication of audio collection can be presented to inform the user of data collection. The notification can be for all collections, or collections exceeding a threshold. For example, users can be presented with a prompt to authorize the collection (e.g., full spectrum audio data can be recorded to confirm an indication of a condition, or to better characterize an audio signature 122 associated with a condition).

A call for the audio data can be initiated by a vehicle user or occupant. For example, the user or occupant can initiate the call through a graphical user interface associated with the vehicle, such as the CID 410 or another display of the electric vehicle or a mobile device. The call for audio data can include one or more microphones. For example, a call for audio data can include a microphone of the electric vehicle, and a microphone of the mobile device. The call for audio data can include a selection of one or more components of the electric vehicle. For example, if a component of interest is an HVAC system, the call for audio data can include (or the data processing system 102 can provide, responsive to the call) a state of the electric vehicle, such as operating the HVAC system.

The notification can be provided to the electric vehicle 300. For example, the electric vehicle 300 (e.g., via electric vehicle system 152) can connect to a data processing system 102 via a network 150. The data processing system 102 can transmit a notification to a transceiver of the electric vehicle, over to the network. The electric vehicle can thereafter display the notification (e.g., by a graphical user interface). The notification can be provided to another device. For example, the notification can be provided to a mobile device associated with the electric vehicle, or a user account associated with the vehicle (e.g., by a webpage). The notification can indicate to perform an action related to the electric component, such as a visual inspection, or performance adjustment.

Figure 5:
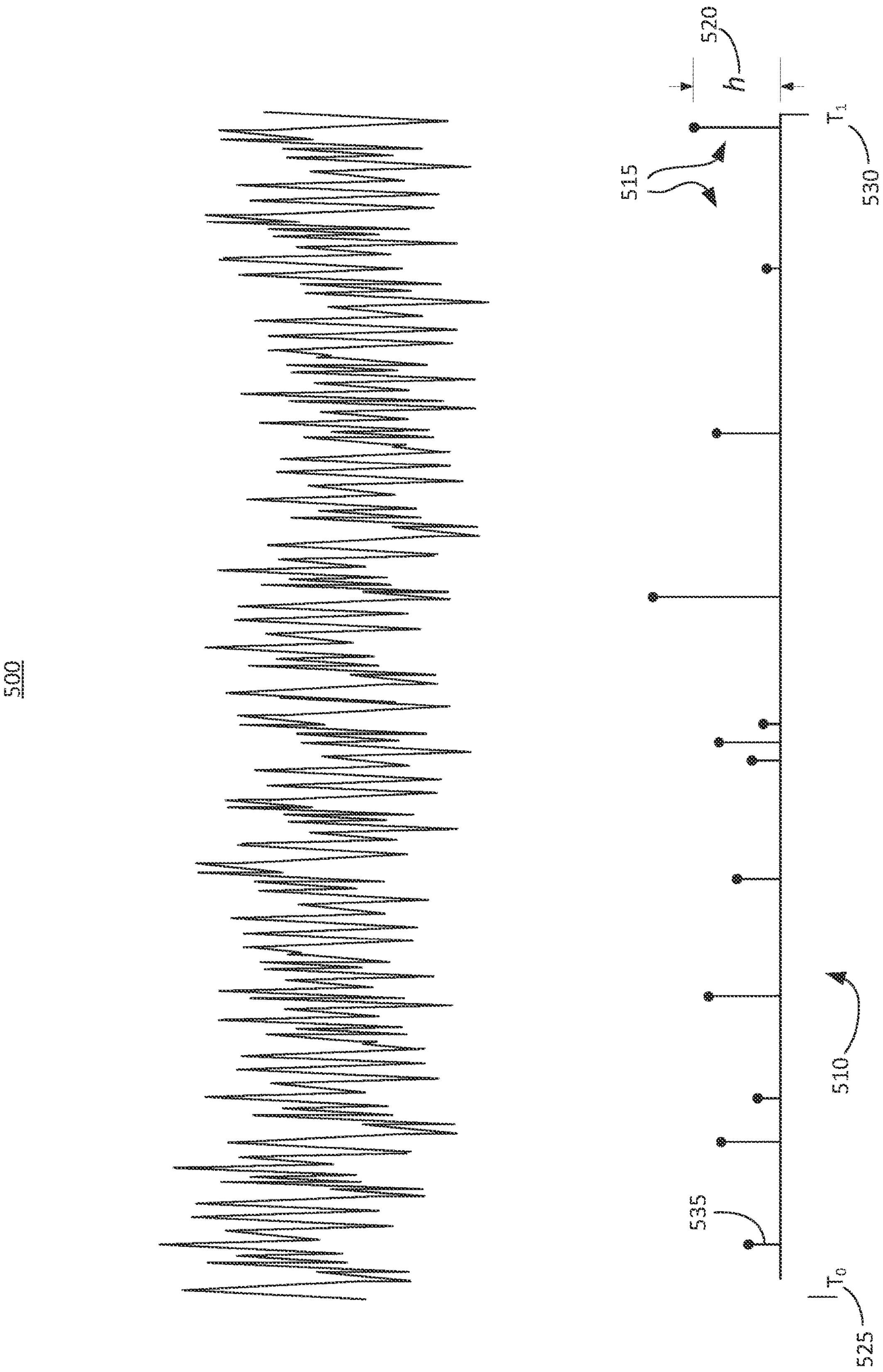
FIG. 5 is a time domain representation of audio data, in accordance with some aspects.

FIG. 5 illustrates a time domain representation 500 of audio data 170, in accordance with some aspects. One or more instances of audio data 170 can include can include a predetermined number of samples 515. The predetermined number of samples 515 can be based on a native sampling rate of a sensor 154 (e.g., 44.1 kHz). For example, 44,100 samples can be predefined by selecting a time period of one second for a sensor 154 having a native sampling rate of 44.1 kHz. A predefined number of samples 515 can be absolute or statistically targeted. For example, an absolute number of 440 samples can be selected, or each sample of a 1 second audio sample at 44.1 kHz can have about a one percent chance of selection. About 440 samples 515 can be predetermined as a statistical target, while the exact number of samples 515 can vary from iteration to iteration.

The samples 515 can have non-uniform periodicity. For example, the samples 515 can be randomly selected, such as by randomly distributing a predetermined number of samples 515. For example, twelve samples 515 of the audio data 170 can be distributed at random within a period of time 510 between a start time 525 and a stop time 530. The period of time 510 can be fixed or variable. The period of time 510 can be defined based on the selection of the samples 515. For example, the samples 515 can be selected having random intervals wherein various randomizations of samples can result in varying stop times 530 (e.g., audio data 170 having greater intervals between samples can be associated with a later stop time).

A file can include the samples 515 and temporal position thereof. For example, each of the samples 515 can include a magnitude 520, as well as a position, such as a temporal position associated with the sample 515. The temporal position can be absolute (e.g., a time) or relative. For example, the temporal position can be with reference to the start time 525 of the audio data 170 which can be or be based on the first sample 515 or another time.

The audio data 170 can be down-sampled to one or more non-native frequencies. For example, if a microphone is capable of sampling at 44.1 kHz, and a sampling frequency of 8 kHz is desired, the audio data can be down-sampled to 8 kHz. The down-sampled audio data can reduce a file size, a processing requirements, or a memory requirement. For example, the non-uniform samples can be selected from the down-sampled audio data 170.

One or more components of vehicles (e.g., electric vehicles 300) emit tonal data which can be collected in the audio data 170. For example, electric motors, bearings, or inverters can emit tonal data. Some tonal data can have a single dominant frequency or a single dominant fundamental frequency. Some tonal data can include multiple frequencies (e.g., two, three, four, or five frequencies or fundamental frequencies).

The compression function can be applied in real time. For example, the microphone can sample an environment based on an input at random points, or samples captured by the microphone can be randomly retained (e.g., before or after any down sampling thereof). Real time applications can be referred to as near-real time applications based on delay from transmission lines or the selection of samples. As referred to herein, real time applications includes applications wherein the audio data 170 is compressed while being collected by the sensor. Any processing of the audio data 170 after the audio data 170 collection has been completed by the microphone is termed non-real time, as referred to herein.

Figure 6:
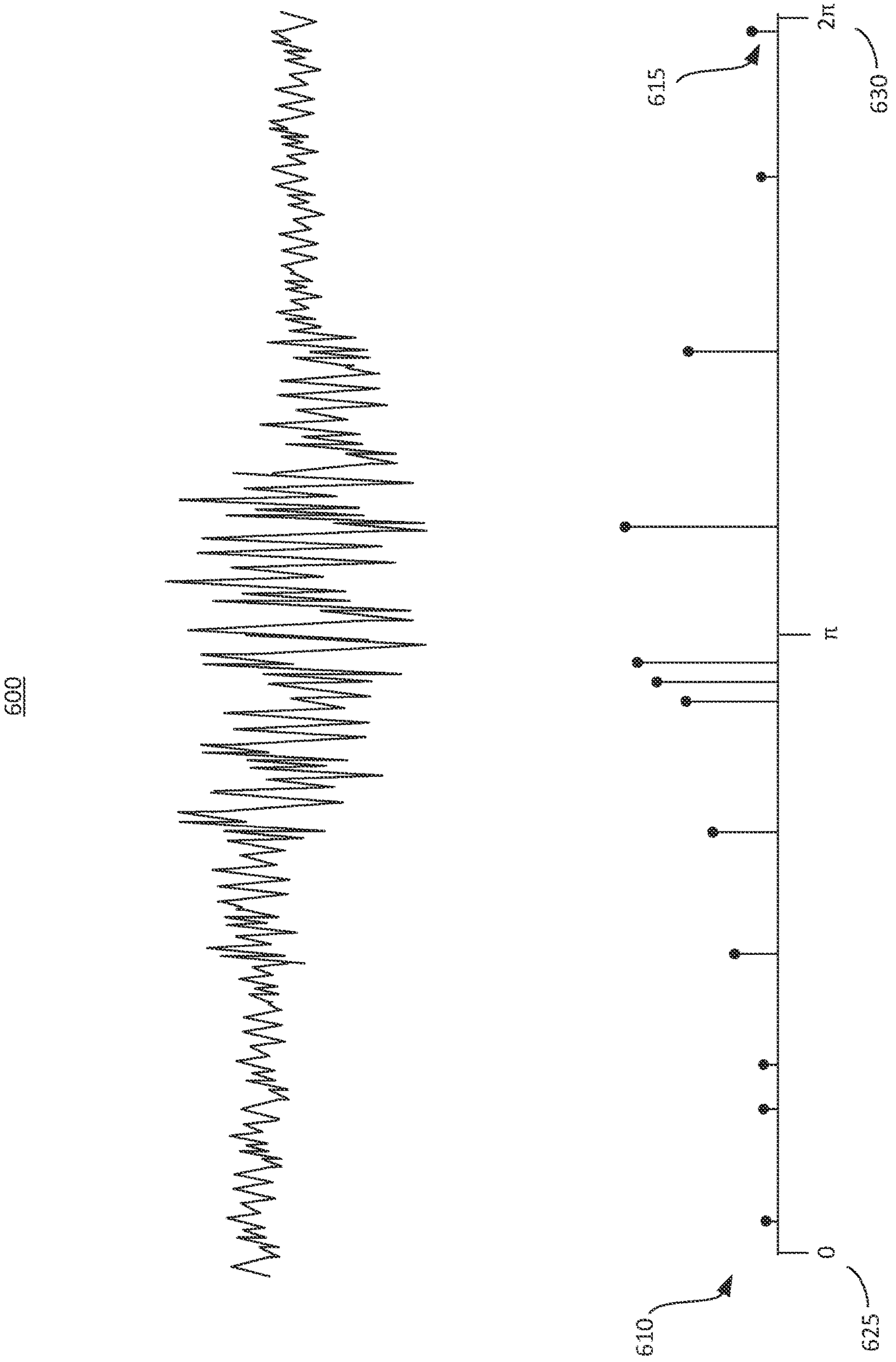
FIG. 6 is an angle domain representation of audio data, in accordance with some aspects.

FIG. 6 illustrates an angle domain representation 600 of audio data 170, in accordance with some aspects. One or more instances of audio data 170 can include a predetermined number of samples having a non-uniform periodicity. The samples 615 can be sampled (e.g., by the audio transceiver) with regard to an angle (e.g., a rotation or phase angle) of a component of an electric vehicle 300. The samples can be sampled at a native or other rate (e.g., a down-sample rate) and associated with the angle. The angle can be an absolute angle (e.g., where 0° 625 is defined based on a location of a rotating part) or can be relative (e.g., where the angle is related to the sample time based on a rotational speed such that 0° 625 can define any location of a rotating device based on a start time of the audio data 170). For example, an inverter or transformer can be associated with one or more angle domains (e.g., the angle domain of an input or output current). The period of rotation can extend from 0° 625 to 360° 630 or another value. For example, a screw can have a period of rotation 610 in excess of 360° 630 and a control arm can have a period or rotation of less than 360° 630.

The audio data 170 can be sampled relative to one or more angle domains. For example, the angle domain can be an angle domain of a component of the electric vehicle 300. The angle can relate to an angle of a mechanically rotating component (e.g., the location of the component) or to the phase of another component. For example, an vehicle can be have a left electric motor and a right electric motor. As the electric vehicle 300 navigates a turn, the left and right electric motors can have differential rotations per minute (RPMs). For example, the left motor can turn at 300 RPM, and a right motor can turn at 270 RPM. An angle domain applies the audio data captured in the time domain to the angle domain of the rotation of the motor. For example, the angle domain of the left motor is resampled over time every 200 ms, while the angle domain of the left motor is resampled over time every 222 ms. Thus, if FIG. 6 represents the angle domain of the left motor, the rightmost sample 615 can be taken at about 200 ms, about 400 ms, about 600 ms, and so forth, and the leftmost sample can be taken at about 0 ms, about 200 ms, about 400 ms and so forth.

The angle domain data can indicate a difference in operation between a component having an angle and that angle. For example, an electric motor can have a phase relationship between one or more rotor lobes as a part of normal operation. Angle domains can indicate additional performance characteristics of components. For example, the audio signal can indicate a performance of the electric component. The detection of the performance of the part can be detected upon a performance of the vehicle.

The audio data 170 can be resampled relative to one or more angle domains. For example, audio data 170 can be captured in a time domain, and thereafter be sampled to one or more angle domains. For example, audio data 170 can be captured, and thereafter be resampled according to an angle domain of an electric motor of the electric vehicle 300, an angle domain of the wheels of the electric vehicle, and the inverter of the electric vehicle. The angle domains can be sequentially or simultaneously sampled. For example, the road noise and inverter data can be used (e.g., by the electric vehicle 300 or the data processing system 102) to isolate an audio signature 122 of the electric motor. Radio audio out data (e.g., from a preamplifier of the CID 410) can be used to approximate the audio data 170 of the electric vehicle 300 without the radio (e.g., subtractively).

The audio data 170 can include audio signatures 122 indicative of the performance of a component. For example, the audio data 170 can contain tonal information which is indicative of a component performance (e.g., condition, wear, or efficiency). For example, the audio data 170 can include a tone or an amplitude thereof that indicates a component is operating at a performance level. For example, an audio signature 122 can indicate a different in a performance level of the electric component.

The audio signatures 122 can be generated (e.g., synthesized) based on a known frequency or set of frequencies associated with a component and a speed or other characteristic of the electric vehicle 300 or can be based on comparison with other electric vehicles 300 or a baseline reading of the same electric vehicle 300. For example, if a fan of an HVAC system is known to be associated with an audio signature equal to an operating speed, and is known to be operating at 1200 Hz, the synthetic audio signature 122 can be generated. A baseline of a vehicle operating state can be determined for one or more vehicles. The baseline can include one or more component parts for each noise producing component of interest such that later analysis of the vehicle (or other vehicles) can be compared to the baselines. Baselines can be compared to other baselines (e.g., an end of line test or benchmarking).

Figure 7:
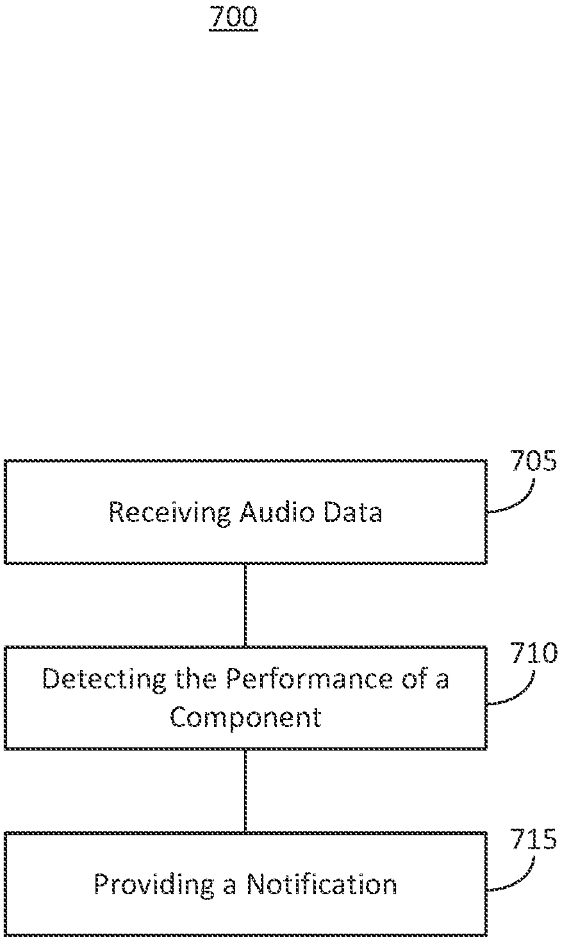
FIG. 7 depicts a method of monitoring the performance of electric vehicle components using tonal analysis, in accordance with some aspects.

FIG. 7 depicts a method 700 of processing audio data 170, in accordance with some aspects. The method 700 can be performed by one or more components or systems described in FIG. 1 or throughout this disclosure. In brief summary, at ACT 705, audio data is received. At ACT 710, the performance of an electric component is detected. At ACT 715, a notification is provided.

At ACT 705, one or more audio datum are received. For example, audio data 170 can be sampled from a sensor 154 in a passenger cabin 305 of an electric vehicle 300. Audio data 170 can be collected from a sensor 154 (or another sensor, such as an accelerometer) from various locations of an electric vehicle. For example, the audio data 170 can be collected from an undercarriage, a sensor 154 of a mobile device associated with the electric vehicle 300 (e.g., having a mobile application thereon associated with the electric vehicle 300), or a plurality of sensors (e.g., which can determine a location of a source of an audio signature 122, reject ambient audio data 170, or otherwise improve the fidelity of the audio data 170). The audio data 170 can be indicative of a performance of a component, such as a component of a thermal subsystem of an energy storage device, an electric drive unit, an electric vehicle charger, a landscaping tool, or any other device. The sampled data can be compressed according to a non-uniform (e.g., random) periodicity which may or may not include a time stamp associated with each sample thereof. The compression can render a first portion of native audio data 170 irreversibly compressed and a second portion of native audio data 170 reversibly compressed. For example, the first portion can include a wind noise having a frequency (e.g., a fundamental or harmonic frequency) above a threshold and the second portion can relate to a motor having a frequency below the threshold. The sampled data can be conveyed, as one or more files containing tonal data, to a data processing system 102. For example, the tonal data can be provided over a local or wide area network 150, can be retrieved from an OBD port of the electric vehicle 300, or otherwise transferred from the electric vehicle 300 to the data processing system 102. The file can contain additional data concerning the state of the electric vehicle such as a rotation speed of various components (e.g., by providing a vehicle speed from which a rotation speed can be calculated or inferred), or the condition of any noise generating or affecting components (e.g., seat adjustment motors, windows positions, HVAC systems, or charging systems). The noise generating or affecting components can be a component of interest for an audio signature 122 or an interference which can be subtracted, avoided, or otherwise accounted for (e.g., by the electric vehicle 300 or the data processing system 102).

At ACT 710, the performance of an electric component 160 of the electric vehicle 300 is detected. For example, the tonal data can be compared against one or more known audio signatures 122 (e.g., comprising frequency or magnitude 520 thresholds), or can be compared against a plurality of additional tonal data of additional electric vehicles or generated devices (e.g., compared to a component of a highly accelerated life test (HALT), or a synthetic audio signature 122 generated based on a predicted waveform). The tonal data can be compared against a plurality of additional tonal data to associate an electric vehicle 300 with one or more clusters whereby the performance of the one more clusters can be indicative of a performance of a component. For example, a cluster of vehicles can engage in tire rotation in excess of mechanical grip on high traction surfaces such as asphalt. The performance can relate to the efficiency or power of an electric motor, electric drive unit, the aerodynamic properties of a nozzle, or the vibration of a motor mount.

At ACT 715, notification is provided. The notification can be provided to the electric vehicle, (e.g., for display via the CID), to a mobile device of a user associated with the electric vehicle, or to a service center. For example, the service center can verify the performance of the component at a next scheduled inspection, or the notification can prompt the service center to schedule a service visit, such as via the data processing system 102. The notification can include information related to the audio signature 122, or can be a prompt to confirm the audio signature 122. For example, the data processing system 102 can operate transparently to a user of an electric vehicle whereupon the data processing system 102 can detect a potential audio signature 122. The notification can prompt the user to confirm the audio signature 122, such as by better controlling the data collecting parameters. For example, audio data 170 can be collected on a section of road having known audio characteristics (e.g., known tire noise) which can improve the fidelity of the audio data 170 and the tonal data transformed therefrom. The data processing system 102 can prompt the user to collect data at a higher sample rate, such as a native non-uniform rate, or to take other measures for data collection, or can transmit a call for audio data 170 which can provide one or more additional samples of audio data 170 (e.g., on a best-effort basis). A notification can include a prompt to collect further data, to service or inspect the component (e.g., can provide instructions to conduct an inspection), or to alter the use of a device (e.g., to adjust a power setting associated with a component).

The systems and methods herein can be associated with various applications including electric vehicles but are not limited thereto. For example, various data sources can benefit from lower data bandwidth or determinations of performance based on audio data 170 such as tonal data. For example, internal combustion engine vehicles, power supplies, electric vehicle chargers, and escalators can all be associated with audio signatures 122 based on the systems and methods disclosed herein.

Figure 8:
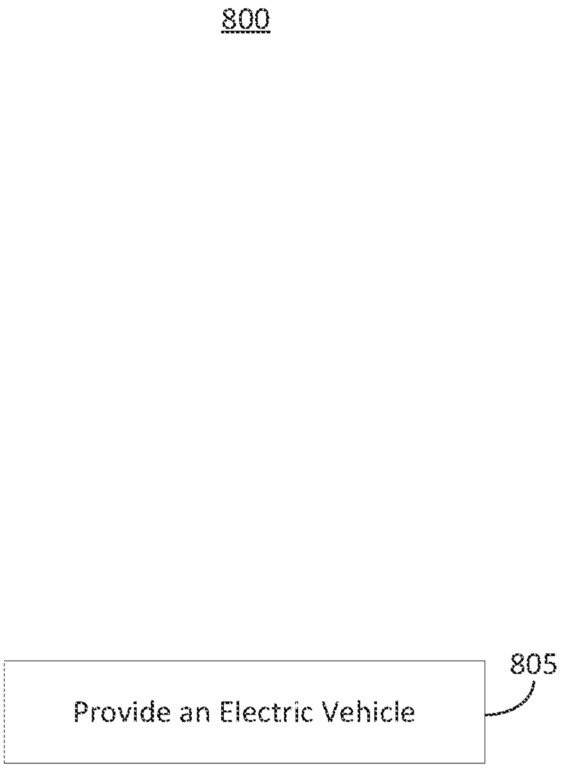
FIG. 8 depicts a method of providing an electric vehicle, in accordance with some aspects.

FIG. 8 depicts a method 800 of providing an electric vehicle. The method 800 can include providing the electric vehicle at ACT 805. The electric vehicle (e.g., electric vehicle 300) can be provided for energy or transportation, such as to a user of the electric vehicle, or a home, office, or dwelling. The electric vehicle 300 can record non-uniform audio samples 515 to derive tonal data from audio data 170. The audio data 170 can be indicative of a component (e.g., a component of or associated with the electric vehicle 300).

Figure 9:
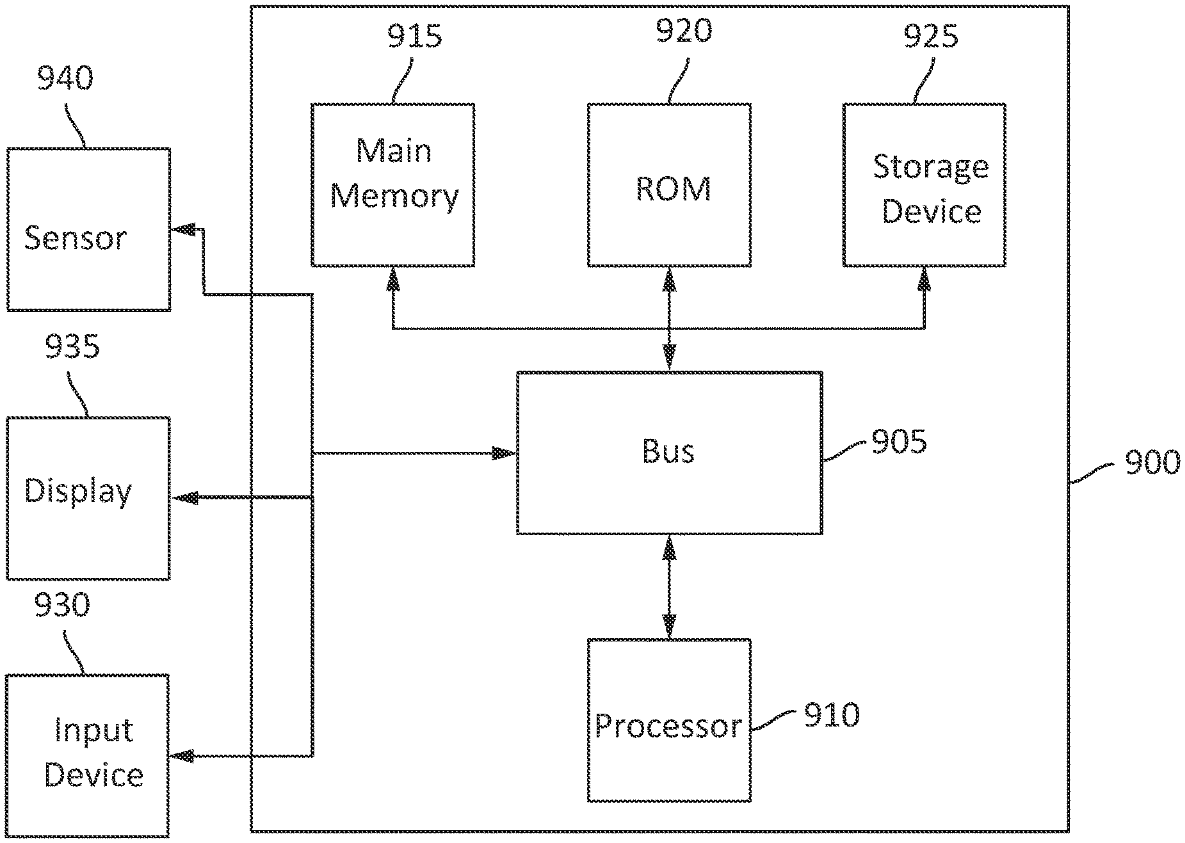
FIG. 9 is a block diagram illustrating an architecture for a computer system that can be employed to implement elements of the systems, methods, and graphical user interfaces described and illustrated herein.

FIG. 9 depicts an example block diagram of an example computer system 900. The computer system or computing device 900 can include or be used to implement a data processing system, electric vehicle system, or its components. The computing system 900 includes at least one bus 905 or other communication component for communicating information and at least one processor 910 or processing circuit coupled to the bus 905 for processing information. The computing system 900 can also include one or more processors 910 or processing circuits coupled to the bus for processing information. The computing system 900 also includes at least one main memory 915, such as a random access memory (RAM) or other dynamic storage device, coupled to the bus 905 for storing information, and instructions to be executed by the processor 910. The main memory 915 can be used for storing information during execution of instructions by the processor 910. The computing system 900 may further include at least one read only memory (ROM) 920 or other static storage device coupled to the bus 905 for storing static information and instructions for the processor 910. A storage device 925, such as a solid state device, magnetic disk or optical disk, can be coupled to the bus 905 to persistently store information and instructions. The computing system 900 can include or interface with a sensor 940 to receive audio data.

The computing system 900 may be coupled via the bus 905 to a display 935, such as a liquid crystal display, or active matrix display, for displaying information to a user such as a driver of the electric vehicle or other end user. An input device 930, such as one or more keys or a voice interface (e.g., the sensor 940) may be coupled to the bus 905 for communicating information and commands to the processor 910. The input device 930 can include a touch screen display 935. The input device 930 can also include a cursor control, such as a touch screen of the display 935, or cursor direction keys, for communicating direction information and command selections to the processor 910 and for controlling cursor movement on the display 935. For example, the cursor control can control the depiction of a map including the electric vehicle or one or more charging stations.

The processes, systems and methods described herein can be implemented by the computing system 900 in response to the processor 910 executing an arrangement of instructions contained in main memory 915. Such instructions can be read into main memory 915 from another computer-readable medium, such as the storage device 925. Execution of the arrangement of instructions contained in main memory 915 causes the computing system 900 to perform the illustrative processes described herein. One or more processors in a multi-processing arrangement may also be employed to execute the instructions contained in main memory 915. Hard-wired circuitry can be used in place of or in combination with software instructions together with the systems and methods described herein. Systems and methods described herein are not limited to any specific combination of hardware circuitry and software.

Although an example computing system has been described in FIG. 9, the subject matter including the operations described in this specification can be implemented in other types of digital electronic circuitry, or in computer software, firmware, or hardware, including the structures disclosed in this specification and their structural equivalents, or in combinations of one or more of them.

Electric vehicles can include electric and mechanical components that degrade over time and affect the performance of the vehicle. The degradation can be associated with a noise or vibration signature characteristic of the type of wear experienced by the components. Using sensors on the vehicle, the health of the components can be monitored by analyzing the noise or vibration signals.

The analysis of vibration or noise signals within the vehicle can be challenging as it can lead to increased loads on the computational bandwidth of the electronic circuits. Some degradation mechanisms occur over periods of time, and thus continuous monitoring can be omitted. The analysis can be performed by a data processing system 102 communicatively coupled over a network 150, subsequent to providing audio data 170 to the data processing system 102.

Uploading vibration and noise signals in the form of digitized data presents at least two challenges. First, vibration and noise signals can be sampled at high frequency rates, which can generate large files, which can pose a bandwidth constraint. Second, where the vibration or noise signals are detected by microphones inside the cabin, the microphone can detect irrelevant or erroneous audio signals, which, when uploaded, can cause the data processing system to perform excessive signal processing or negatively impact the accuracy or reliability with which the data processing system can determine the performance of the component of the vehicle.

The disclosed methods can use compressed sensing to address the challenges for signals (e.g., for signals meeting a sparsity requirement or threshold). The systems and methods disclosed herein can cause a significant reduction of the file size (compression aspect) and a destruction or deteriorate of the audio content that is not coherent with the audio signature 122. For example, an electric motor noise and vibration signature can be largely harmonic by nature. Much of the information contained in the signal can be described by the harmonic content alone. Such signal can meet a sparseness threshold (e.g., in the frequency domain). A cabin microphone recording can be compressed, and then reconstructed according to the systems and methods described herein. The reconstruction can retrieve the useful information (harmonic content), but voice, radio, or otherwise unrelated content may be destroyed or deteriorated.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of" 'A' and 13' can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. For example, charging and discharging, or power and ground lines may be inverted to similar effect. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The invention claimed is:

1. A system, comprising:

a data processing system comprising one or more processors, coupled with memory, to:

transmit a call for audio data responsive to a detection of a state of an electric vehicle;

receive the audio data captured via a sensor associated with the electric vehicle, the audio data indicative of a performance of an electric component of the electric vehicle, the electric component including a mechanically rotating electric component, and comprising an indication of amplitude at each of a plurality of sample points, the sample points spaced from one another at irregular intervals;

determine, based on a verification that the audio data meets a sparsity threshold, that the audio data is sparse audio data;

verify the sparse audio data based on an angle domain of the mechanically rotating electric component of the electric vehicle:

detect, based on a comparison of the sparse audio data with an audio signature corresponding to the mechanically rotating electric component of the electric vehicle, a change in the performance of the mechanically rotating electric component; and provide, responsive to the detection of the change in the performance of the electric component, a notification indicative of the change in the performance of the mechanically rotating electric component.

2. The system of claim 1, wherein:

the sensor is a microphone; and the comparison of the sparse audio data with the audio signature comprises selecting a predetermined number of the sample points.

3. The system of claim 1, comprising the data processing system to:

reconstruct tonal data of the mechanically rotating electric component of the electric vehicle using compressed sensing.

4. The system of claim 1, comprising:

wherein the state of the electric vehicle is based on vehicle state data comprising at least one of a speed of the electric vehicle, a location of the electric vehicle, an acceleration of the electric vehicle, an altitude of the electric vehicle, a temperature of a component of the electric vehicle, an ambient temperature, a level of ambient noise, traffic patterns, braking patterns, an environmental temperature, weather information, humidity information, precipitation information, or odometer information.

5. The system of claim 1, comprising:

the data processing system to transmit the call for the sparse audio data comprising a desired state of the electric vehicle.

6. The system of claim 1, wherein the sparse audio data is sampled based on an angle domain of the mechanically rotating electric component of the electric vehicle.

7. The system of claim 1, comprising:
the data processing system to receive a unique identifier of the electric vehicle, and the state of the electric vehicle.

8. The system of claim 1, comprising:
receiving additional sparse audio data from a plurality of microphones located in a plurality of additional electric vehicles, the additional sparse audio data comprising an indication of amplitude at each of a plurality of additional sample points, the additional sample points spaced from one another at irregular intervals;
receiving vehicle service data from each of the plurality of additional electric vehicles; and
determining the audio signature based on the additional sparse audio data and the vehicle service data.

9. The system of claim 1, comprising:
receiving additional sparse audio data from each of a plurality of microphones associated with a plurality of additional electric vehicles, the additional sparse audio data comprising an indication of amplitude at each of a plurality of additional sample points, the additional sample points spaced from one another at irregular intervals; and
receiving vehicle service data associated with the plurality of additional electric vehicles.

10. The system of claim 1, comprising:
the data processing system to:
receive additional sparse audio data from each of a plurality of additional electric vehicles, the additional sparse audio data comprising an indication of amplitude at each of a plurality of additional sample points, the additional sample points spaced from one another at irregular intervals;
receive additional states of each of the plurality of additional electric vehicles; and
determine a correspondence of the audio signature to the change in the performance of the mechanically rotating electric component based on the additional sparse audio data and the additional states.

11. The system of claim 1, wherein the sparse audio data comprises a predetermined number of sample points at random periodicity.

12. A method, comprising:
transmitting, by a data processing system comprising one or more processors coupled with memory, a call for audio data responsive to a detection of a state of an electric vehicle;
receiving, by the data processing system, audio data captured via a sensor associated with the electric vehicle, the audio data indicative of a performance of an electric component of the electric vehicle, the electric component including a mechanically rotating electric component, comprising an indication of amplitude at each of a plurality of sample points, the sample points spaced from one another at irregular intervals;
determining, by the data processing system based on a verification that the audio data meets a sparsity threshold, that the audio data is sparse audio data;
verifying, by the data processing system, the sparse audio data based on an angle domain of the mechanically rotating electric component of the electric vehicle;
detecting, by the data processing system based on a comparison of the sparse audio data with an audio signature corresponding to the mechanically rotating electric component of the electric vehicle, the performance of the mechanically rotating electric component; and
providing, by the data processing system, responsive to the detection of the performance of the mechanically rotating electric component, a notification to service the electric component.

13. The method of claim 12, comprising:
sampling a microphone a predetermined number of times at random interval to generate the sample points;
receiving, by the data processing system, a unique identifier of the electric vehicle; and
associating, by the data processing system, the sparse audio data with the unique identifier of the electric vehicle.

14. The method of claim 12, comprising:
receiving, by the data processing system, additional sparse audio data from each of a plurality of microphones located in a plurality of additional electric vehicles, the additional sparse audio data comprising an indication of amplitude at each of a plurality of additional sample points, the additional sample points spaced from one another at irregular intervals;
receiving, by the data processing system, vehicle service data from each of the plurality of additional electric vehicles; and
determining, by the data processing system, the audio signature based on the additional sparse audio data and the vehicle service data.

15. The method of claim 12, wherein the state of the electric vehicle is based on vehicle state data comprising at least one of a speed of the electric vehicle, a location of the electric vehicle, an acceleration of the electric vehicle, an altitude of the electric vehicle, a temperature of a component of the electric vehicle, an ambient temperature, a level of ambient noise, traffic patterns, braking patterns, an environmental temperature, weather information, humidity information, precipitation information, or odometer information.

16. The method of claim 12, wherein the sparse audio data is sampled based on the angle domain of the mechanically rotating electric component of the electric vehicle.

17. A method, comprising:
transmitting, by a data processing system comprising one or more processors coupled with memory, a call for audio data responsive to a detection of a state of a component;
receiving, by the data processing system, audio data captured via a sensor of an electric vehicle, the audio data indicative of a performance of the component, the component including a mechanically rotating component and comprising an indication of amplitude at each of a plurality of sample points, the sample points spaced from one another at irregular intervals;
determining, based on a verification that the audio data meets a sparsity threshold, that the audio data is sparse audio data;
verifying, by the data processing system, the sparse audio data based on an angle domain of the mechanically rotating component of the electric vehicle;
detecting, by the data processing system based on a comparison of the sparse audio data with an audio signature corresponding to the mechanically rotating component, the performance of the mechanically rotating component; and
providing, by the data processing system, responsive to the detection of the performance of the mechanically rotating component, a notification to service the component.

18. The method of claim 17, wherein:

the sensor is a microphone located in a passenger cabin of the electric vehicle; and the sparse audio data comprises a predetermined number of the sample points.

19. The method of claim 17, comprising:

transmitting, by the data processing system, a file comprising a predetermined number of samples, and temporal positions of the predetermined number of samples.

20. The method of claim 17, wherein the state of the electric vehicle is based on vehicle state data comprising at least one of a speed of the electric vehicle, a location of the electric vehicle, an acceleration of the electric vehicle, an altitude of the electric vehicle, a temperature of a component of the electric vehicle, an ambient temperature, a level of ambient noise, traffic patterns, braking patterns, an environmental temperature, weather information, humidity information, precipitation information, or odometer information.

* * * * *